Dec. 24, 1940.  R. R. KNOWLTON  2,226,474
DUAL CONFECTION DEVICE
Filed June 23, 1939
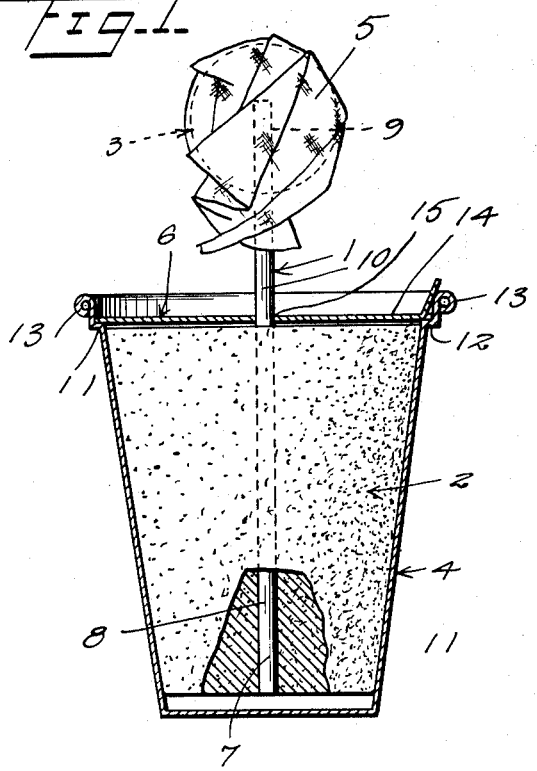
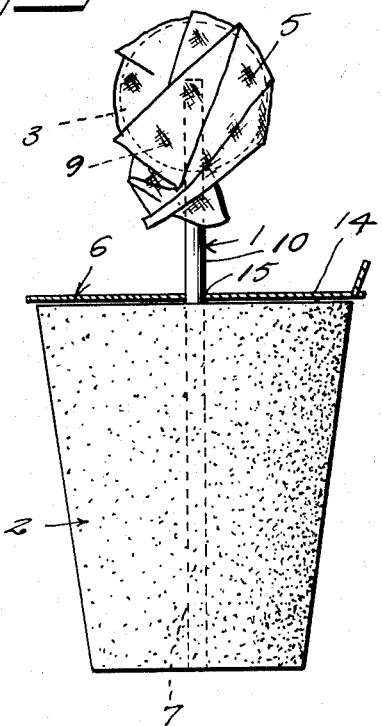
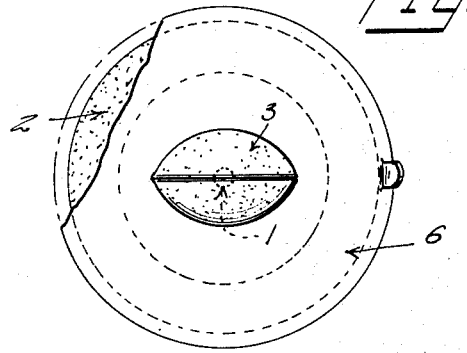
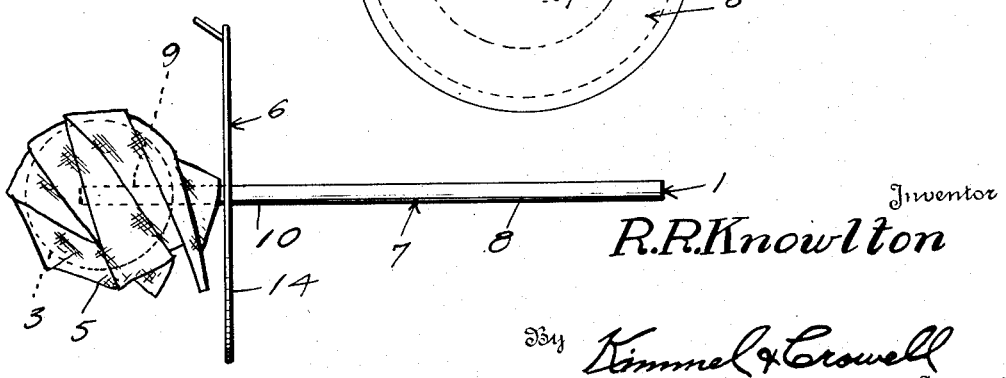
Inventor
R. R. Knowlton
By Kimmel & Crowell
Attorneys Patented Dec. 24, 1940

2,226,474

UNITED STATES PATENT OFFICE 2,226,474

DUAL CONFECTION DEVICE

Robert R. Knowlton, Ceredo, W. Va.

Application June 23, 1939, Serial No. 280,893

1 Claim. (Cl. 99—137)

This invention relates to a new article of manufacture, such as a dual confection device.

The invention resides in the provision of a dual confection device including a normally protected frozen edible, a normally protected solid non-frozen edible spaced from the other edible and a combined holder, guard and handle means common to said edibles.

The invention further aims to provide in a manner as hereinafter set forth, an article of merchandise including edibles of different characters arranged to be selectively consumed and a guard common to and interposed between the edibles.

The invention further aims to provide, in a manner as hereinafter set forth, a dual confection device which is inexpensive and particularly attractive to children.

The invention further aims to provide, in a manner as hereinafter set forth, a dual confection device including a frozen edible in the form of a body of ice cream, custard or flavored water ice, a solid non-frozen edible in the form of a body of candy, the edibles being disposed in spaced relation for selective consumption, a holder common to the edibles and with the holder constituting a handle or grip for use by a person who selectively consumes the edibles.

The invention further aims to provide, in a manner as hereinafter set forth, a dual confection device including a solidified edible of the class which is semi-plastic at temperatures above sub-normal and solid at sub-normal temperature, a solidified edible of the class which is semi-plastic at temperatures above normal temperature and solid at normal temperature, and a combined holder, guard and handle means common to said edibles.

Embodying the aims aforesaid and others which may hereinafter appear, the invention consists of the novel construction, combination and arrangement of parts to be more specifically described and as illustrated in the accompanying drawing, wherein is shown an embodiment of the invention, but it is to be understood that changes, variations and modifications may be resorted to which fall within the scope of the invention as claimed.

In the drawing:

Figure 1 is a view of the device partly in elevation and partly in longitudinal section, Figure 2 is a front elevation of the device with the protector for the frozen edible removed and with the guard common to the edibles shown in diametric section, Figure 3 is a top plan view of the device with the guard broken away and the protector for the non-frozen edible omitted, and Figure 4 is a view in side elevation illustrating those elements of the device forming the holder or carrier, the guard and the protector for and arranged in enveloping position with respect to the non-frozen edible.

A dual confection device, in accordance with this invention includes a holder or carrier 1 of stick-like form of the desired length and thickness, a solid frozen edible 2 in the form of a body of ice cream, custard or water ice carried by the holder 1, a solid non-frozen edible in the form of a body of candy carried by the holder 1 and which preferably will be what is termed a "sucker" and generally known as a "lollipop," a protector 4 for normally protecting the edible 2 and which is in the form of a tapered container open at its large end and closed at its smaller end for removably receiving the edible 2, a protector 5 for normally protecting the edible 3 and which is in the form of a bendable wrapper of translucent or transparent material completely enveloping and readily removable from the edible 3, and a disc-like axially apertured element 6 slidably mounted on the holder 1 and which provides a removable closure for the protector 4, a guard common to the edibles 2, 3 and a support for edible 2 when the latter is removed from protector 4 and disposed vertically.

Preferably the edible 2 will be larger than the edible 3, and it is frozen solid about and secured to what is termed the inner portion of a stick 7 which provides the holder 1. The edible 3 is solid, encompasses and is secured to the outer end terminal portion of the stick 7, as well as extending from the outer end edge of the latter. The said inner portion of the stick is indicated at 8, the said outer end terminal portion of the stick is designated 9 and that part of the stick 7 between the edibles 2, 3 is indicated as 10 and such part is termed the intermediate portion of the stick 7. The edible 2 is normally fixed to the stick portion 8 and will be of a contour corresponding substantially to the contour of the protector 4. The solidified edible 2 will be of the class which is semi-plastic at temperatures above sub-normal temperature and solid at sub-normal temperature. The solidified element 3 will be of the class which is semi-plastic at temperatures above normal temperature and solid at normal temperature.

The protector 4 comprises what may be termed a cup-like tapered body 11 of paper formed with an annular seat 12 and an annular angle-shaped flange 13 at its open end. The size of the edible 2 will be such as to substantially completely fill the body 11 from its closed end to the seat 12. The flange 13 is offset with respect to the open end of the body 11. The seat 12 is provided by the edge of the body 11 at the open end of the latter and a part of flange 13.

The element 6 is formed of a circular body 14 slidably mounted on element 1 and having an axial opening 15 for the passage through the body 14 of element 1. Normally the element 6 is arranged against the seat 12 and frictionally engages with the flange 13 of the body 11 for closing the open end of the latter. The element 6 when removed from the body 11 is slidably positioned on the part 10 of the stick 7. The element 6 not only constitutes a closure for the body 11, a support for edible 2 when the latter is vertically disposed and a guard common to edibles 2, 3, but also a protector for one end of the edible 2 when element 6 is mounted against the seat 12 to close body 11 when containing edible 2.

The protector 4 may be readily slid off of the edible 2 after the protector has been rolled a few moments, which action frees the edible 2 from the inner face of body 11. The element 6 when on part 10 of the stick 7 will act as a guard for the fingers of the consumer relative to edible 2 when the latter is being consumed and will also act as a guard for the fingers of the consumer relative to edible 3 when the latter is being consumed. It is to be understood that the protector 5 will be removed from edible 3 when the latter is to be consumed. Preferably the protector 5 will not be removed from edible 3 when edible 2 is being consumed. It is also obvious that element 6 may be removed from protector 4 and slid on element 1 to an extent to permit of one using a suitable instrument, not shown, for consuming or removing the contents of protector 4.

The protectors 4 and 5 are removable from the edibles 1, 2 respectively. Each protector when in protecting relation with respect to its correlated edible coacts with the latter to provide a grip for a hand of the consumer to hold the article while consuming an edible from which its protector has been removed.

What I claim is:

As a new article, a confection comprising a pair of edible members, a stick connecting said members together in spaced relation, the opposite ends of said stick being embedded in said members and there being a substantial length of said stick disposed between said members, a flexible protector about one of said members and engaging about a portion of said stick between said members, a pre-formed frusto-conical protector about the other member, the larger end of said latter protector being innermost, said other edible member being in the form of a frozen confection, and a combined protector closure and guard slidably engaging said stick and removably engaging in the larger end of said latter protector, said combined closure and guard being of disc-like form and having a diameter substantially greater than the diameter of said one member, said one edible member being formed of candy substantially smaller in diameter than said other edible member whereby said one edible member may be snugly grasped in the palm of a hand.

ROBERT R. KNOWLTON.